March 30, 1954  T. S. KLINE ET AL  2,673,471
CHAIN SPROCKET WITH SELECTIVE WELDED HUB
Filed March 30, 1950
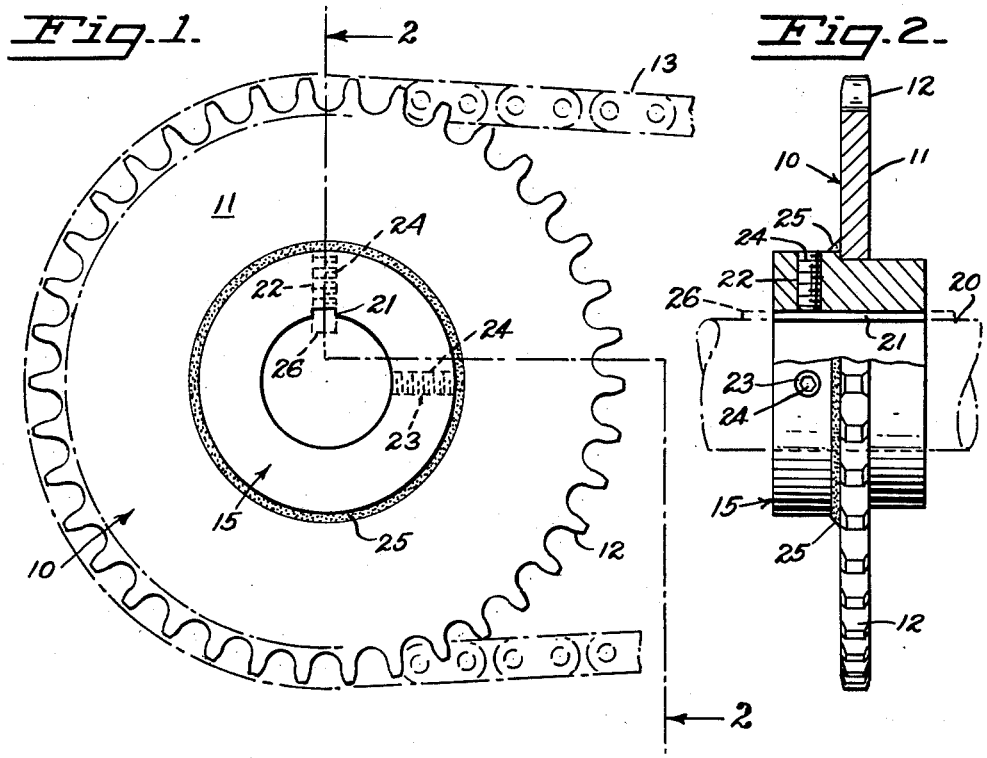
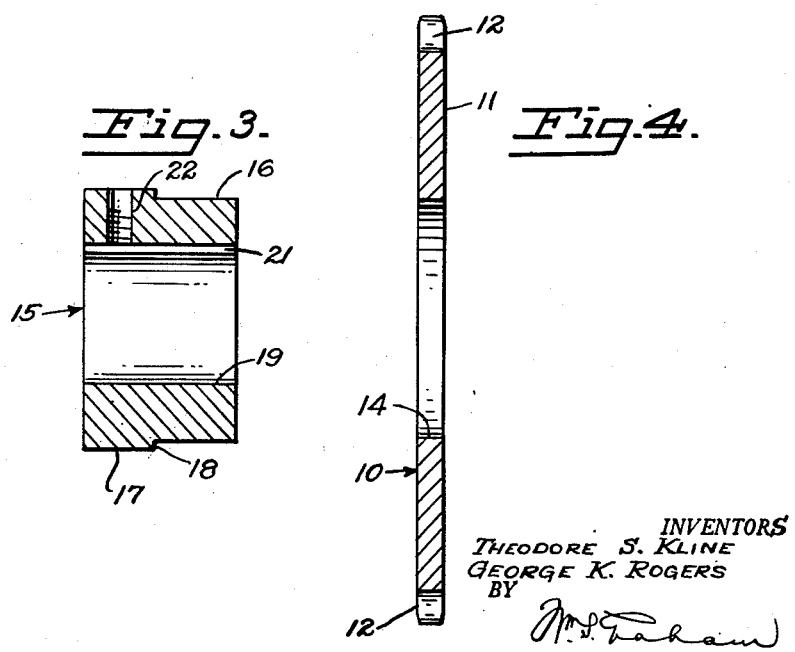
INVENTORS
THEODORE S. KLINE
GEORGE K. ROGERS
BY
ATTORNEY

UNITED STATES PATENT OFFICE 2,673,471

CHAIN SPROCKET WITH SELECTIVE WELDED HUB

Theodore S. Kline and George K. Rogers, Sacramento, Calif.

Application March 30, 1950, Serial No. 152,847

1 Claim. (Cl. 74—243)

This invention relates to selective hub sprockets for roller chains, and more particularly to such sprockets having selectively interchangeable hubs adapted for mounting in the center bore of a sprocket plate and welded thereto, whereby hubs for mounting of varying sized sprockets on shafts of varying diameters may be readily accomplished.

Heretofore, in order to provide a new or replacement sprocket for a particular shaft, it has been necessary to axially bore the central portion or hub of a sprocket to the correct diameter of a shaft on which it is to be mounted, cut a key seat longitudinally in the walls of the shaft bore, and drill tap holes for set screws to hold the sprockets longitudinally relative to the shaft. Frequently the hub of an integral sprocket is too long to fit in a certain allotted space on a shaft and the length of the hub must be machined to be accommodated within the allotted space on the shaft. In other instances the sprocket teeth may have become worn or the sprocket plate broken or bent or otherwise damaged and if the entire sprocket is integral, this requires replacement of the entire sprocket including the hub, frequently requiring the shut-down of an operation until a new sprocket may be fabricated. Due to the shape, size and bulk of the integral sprocket it is difficult to drill a bore in the hub in perfect axial alignment perpendicular to the plane of the sprocket plate, and it is equally difficult to properly machine a key seat or slot in the hub, and to drill proper threaded holes for set screws to stay the sprocket against longitudinal movement on a shaft.

The invention herein comprises a sprocket plate of flatly planar sheet material, the sprocket being of the usual circumferentially toothed type and having a concentric bore through its plate, and a hub member provided with a shaft bore concentric with the sprocket and hub, the hub bore having a suitable seat for a shaft key. The main portion of the hub has a snug slidable fit with the bore of the sprocket plate, and at one end the hub is provided with a radially extended flange providing a circumferential wall parallel to the hub axis, and providing a shoulder perpendicular to the main portion of the hub. The shoulder is in superficial contact with the face of the sprocket plate when the main portion of the hub is mounted in the bore of the sprocket plate, whereby a welded seam may be applied circumferentially of the shoulder which is in contact with the face of the sprocket. The flange is of sufficient axial length to receive bores for set screws to engage the shaft key and the body of the shaft.

The object of the invention is to provide a flatly planar sheet sprocket and a selective hub, in which the sprocket plate has a bore for a hub and the hub is a separate member insertible in the bore in the sprocket plate, the hub being provided with a flange at one end thereof having a shoulder for seating in snug superficial contact with the sprocket plate, whereby the hub may be welded to the sprocket plate to provide a unitary sprocket and hub structure.

With the foregoing and other objects in view, one form in which the invention may be embodied is described herein and illustrated in the accompanying drawing, it being understood that variations of details may be resorted to without departing from the invention which is defined in the appended claim.

In the drawing:

Fig. 1 is a front elevational view of the sprocket and hub of the invention, a roller chain being shown in broken lines.

Fig. 2 is a side elevation of Fig. 1, partly in section on line 2—2 of Fig. 1, a shaft being shown in broken lines.

Fig. 3 is a central longitudinal section of hub member of Fig. 1.

Fig. 4 is a central transverse section of sprocket plate member of Fig. 1.

Referring to the drawing in which like reference characters indicate corresponding parts in the several views, 10 is a sprocket comprising a plate 11, preferably a flat steel plate planar at its opposite faces and having the usual circumferential teeth 12 for engaging roller chain 13. The sprocket has a uniformly concentric bore 14 therethrough.

A solid or rigid hub member 15 is provided for mounting in the sprocket plate bore 14, the hub having a cylindrical main body portion 16 circumferentially smoothly and cylindrically machined to snugly fit the plate bore 14. The hub being solid and rigid is non-contractible radially to its axis, and is provided at one end portion with a radially extended circumferential flange 17, thus providing a shoulder 18 which is perpendicular to the hub axis and to the circumferential machined portion 16, whereby, when the portion 16 is mounted in the plate bore 14, the shoulder 18 contacts one face of the plate 11 and thus positions the hub concentrically relative to the sprocket plate. The machined portion 16 of the hub is of substantially greater length than the thickness of sprocket plate 11 whereby a portion thereof extends beyond the plate, which, together with flange 17, provides a portion of the hub extending laterally on each of the sprocket plates.

The hub has a concentric shaft bore 19 axially therethrough for receiving a shaft 20, the hub bore being provided with a key seat 21 axially longitudinally thereof.

The flange portion 17 of the hub is of sufficient thickness parallel to the axis to provide space for set screw bores 22, 23 radially through the entire body of the flange portion, the screw bore 22 being radial to the key seat 21 and the second set screw bore 23 being circumferentially spaced therefrom substantially 90 degrees, each of said bores being threaded to receive set screws 24.

In operation of assembly of the parts the main machined portion 16 of the hub being of lesser diameter is inserted snugly into the sprocket plate bore 14, and the shoulder 18 of the flange closely superficially contacts the adjacent face of the sprocket plate whereupon the face of the sprocket plate is welded to the hub at or adjacent to the shoulder by a circumferential or annular weld 25, thus providing a unitary structure. The weld being preferably at the contact of the face of the sprocket plate against the shoulder, it leaves the main machined portion 16 of the hub perfectly smooth and cylindrical, which is important because in the event the sprocket plate breaks or becomes worn, the sprocket plate may be removed by chipping the weld and replaced by a new plate being slid with a snug fit over the smooth and undefaced machined portion 16 which has not been roughened by welding flux. Since it is a much more simple operation to make the uniformly concentric central bore in the sprocket plate and the axial bore of the hub as separate units, the cost of the boring operation is greatly reduced. By the unitary welding of the sprocket plate to the hub flange the entire structure becomes integral from its circumferential periphery to the bore of the hub by which it is mounted on a shaft.

By this invention of a hub adapted for fitting the central bore of the sprocket plate, it is operationally feasible to provide a stock of hubs and sprocket plates of varying sizes in which the axial bores of the hubs conform to the usual standard sizes of shaft and in which the outer diameter of the hubs are varied to meet existing conditions of varying types and sizes of sprocket plates. Thus it is possible by combination of varying sizes of hubs and varying sizes and types of sprocket plates to provide a wide range of sprockets either for original installation or for replacements for varying sizes of shafts and varying sizes or types of sprocket plates.

Obviously when the predetermined size of sprocket plate and hub are unitarily joined as by the weld 25 the unitary sprocket may be mounted on a shaft in the usual manner by sliding the unitary sprocket on the shaft with the key 26 of the shaft engaging the key seat 21 of the hub, whereupon the set screws 24, in the two set screw bores 22 and 23, are cinched into contact with the shaft and key, respectively, to stay the sprocket against longitudinal movement.

Having described the invention, what is claimed as new and patentable is:

A selective hub sprocket comprising, a flat planar sprocket plate having teeth circumferentially thereof and having a uniformly concentric bore therethrough, said sprocket plate being integral from its circumferential periphery to its concentric bore, a rigid non-contractible hub having one portion of a diameter snugly fitting within the sprocket plate bore and having another portion comprising a flange of greater diameter providing a flat planar shoulder seated against an adjacent flat planar face of the sprocket plate, an annular weld connecting the periphery of said flange to said flat planar face of said sprocket plate, said hub having a shaft bore axially therethrough and a key seat axially longitudinal of said shaft bore, and said hub having a plurality of threaded bores extending radially through said hub, one of said threaded bores being radial to the key seat, said sprocket plate being selected from a stock of sprocket plates of varying types and sizes, and said hub being selected from a stock of hubs of varying axial bores conforming to the usual standard sizes of shaft and in which the outer diameter of the hubs are of varying sizes to meet existing conditions of varying types and sizes of sprocket plates, whereby there is provided a selective hub sprocket having the desired size hub bore and the desired type and size of sprocket plate.

THEODORE S. KLINE.
GEORGE K. ROGERS.

References Cited in the file of this patent
UNITED STATES PATENTS

| Number | Name | Date |
|---|---|---|
| 307,714 | Garside | Nov. 4, 1884 |
| 2,392,562 | Williams | Jan. 8, 1946 |
| 2,436,694 | Hornbrook, Jr. et al. | Feb. 24, 1948 |